April 17, 1934.    F. O. ALBERTSON    1,954,977
HANDLE AND CABLE HOUSING FOR ELECTRIC MOTOR DRIVEN TOOLS
Original Filed Sept. 3, 1931    4 Sheets-Sheet 3
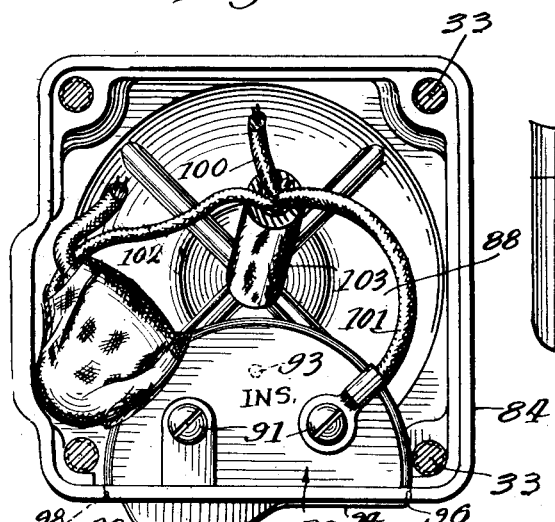
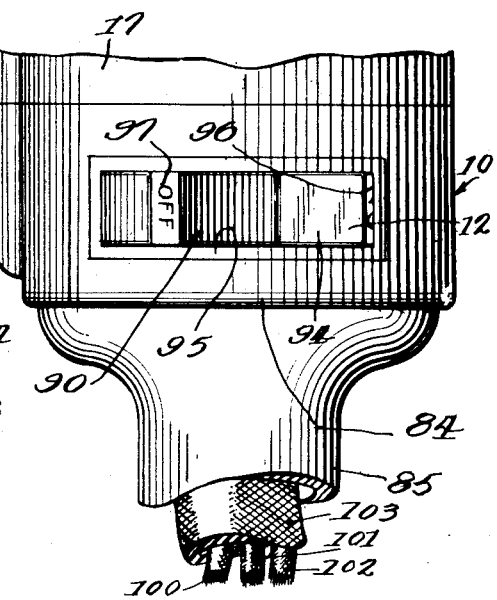
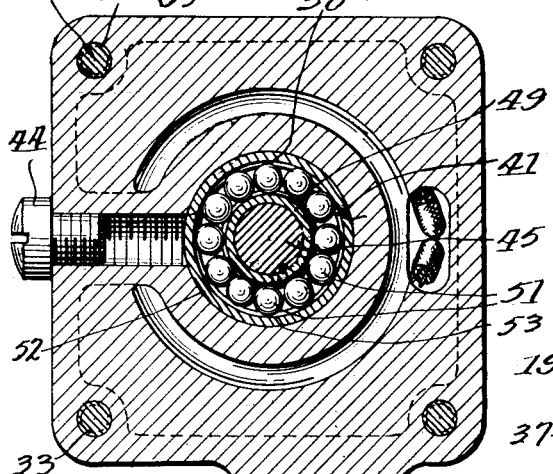
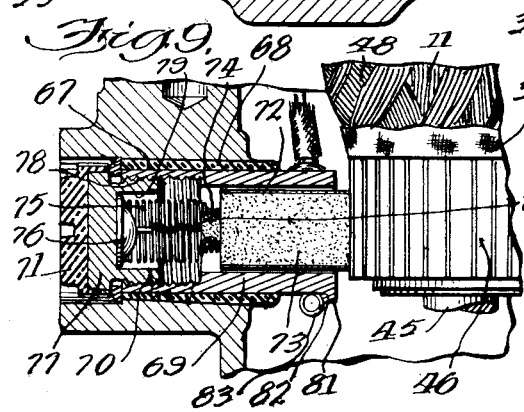
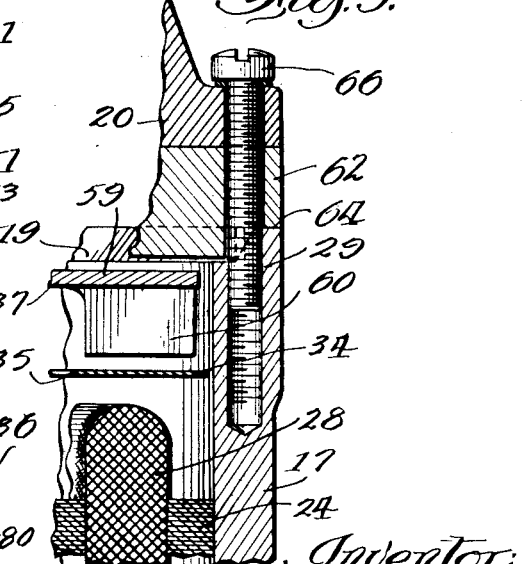
Inventor:
Frans O. Albertson
By Williams, Bradbury, McCaul & Hinkle
Attys.

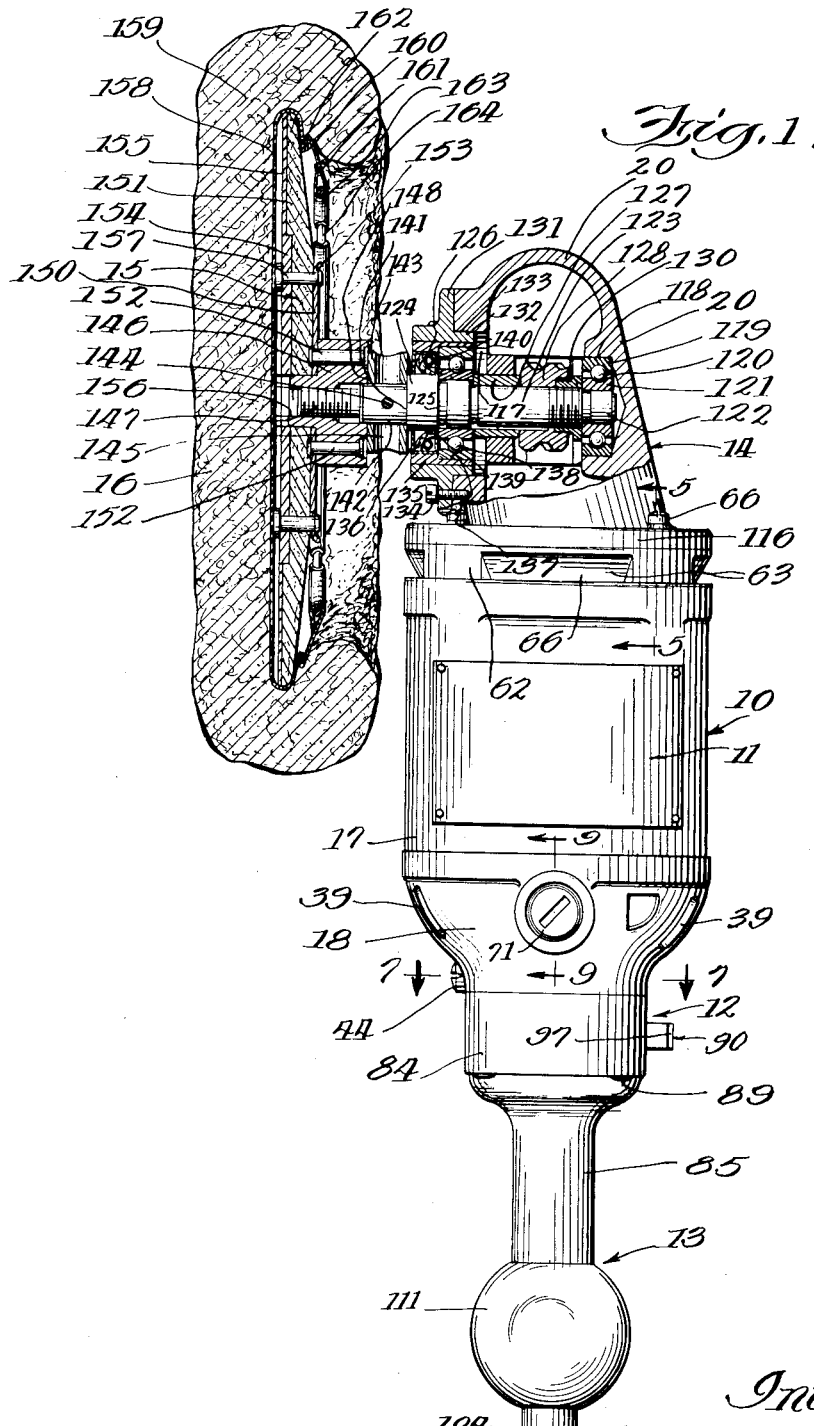

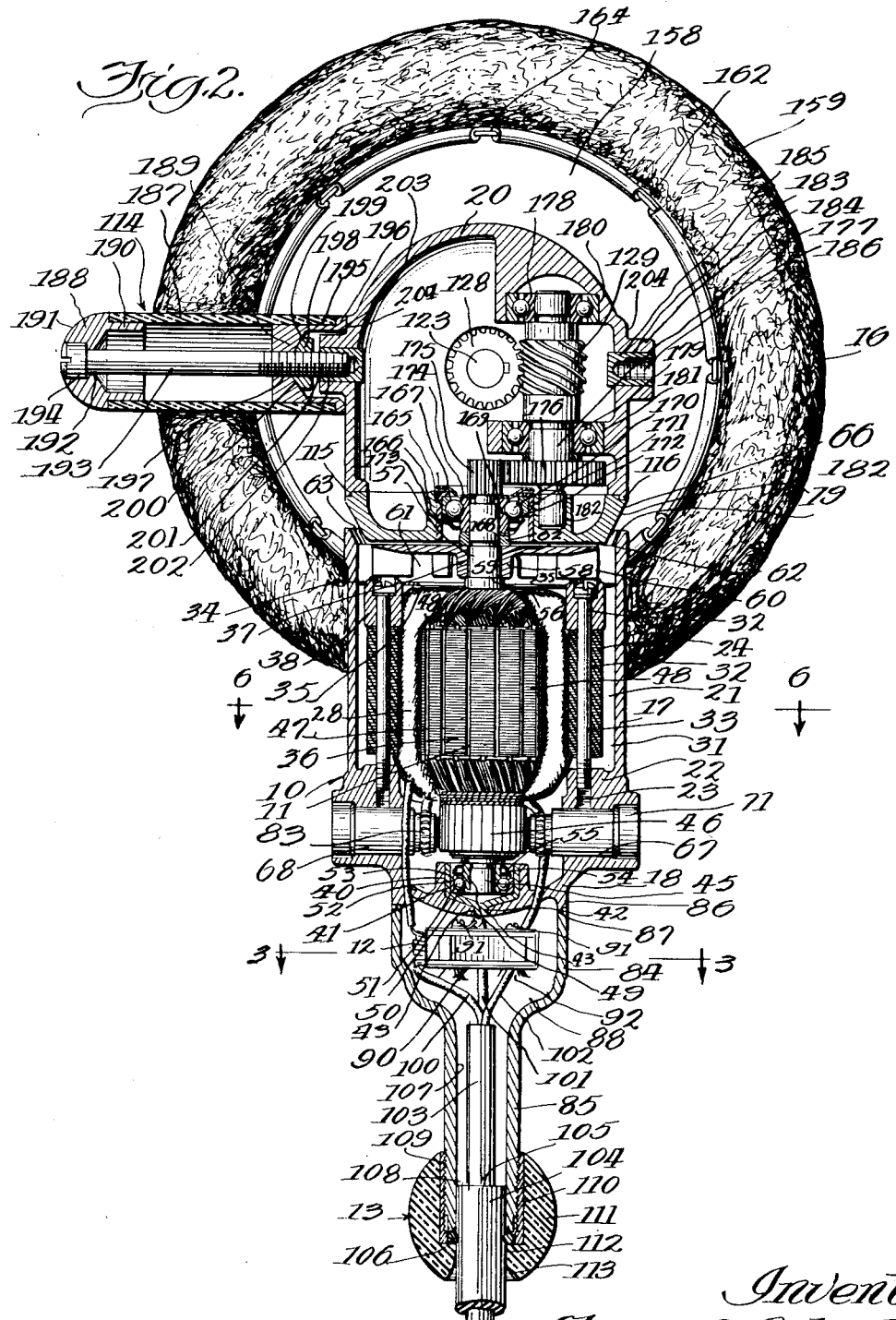

April 17, 1934.　　F. O. ALBERTSON　　1,954,977
HANDLE AND CABLE HOUSING FOR ELECTRIC MOTOR DRIVEN TOOLS
Original Filed Sept. 3, 1931　　4 Sheets-Sheet 4

Inventor:
Frans O. Albertson
By Williams Bradbury,
McCaleb & Hinkle
Attys

Patented Apr. 17, 1934

1,954,977

UNITED STATES PATENT OFFICE 1,954,977

HANDLE AND CABLE HOUSING FOR ELECTRIC MOTOR DRIVEN TOOLS

Frans O. Albertson, Sioux City, Iowa, assignor to Albertson & Company, Inc., Sioux City, Iowa, a corporation of Iowa Application September 3, 1931, Serial No. 560,887
Renewed December 14, 1932

2 Claims. (Cl. 247—13)

The present invention relates to electric polishers, and is particularly concerned with electric polishers that are to be used in sanding, cleaning or polishing automotive vehicles or the like.

One of the objects of the invention is the provision of an improved electric polisher, which is peculiarly adapted to be more conveniently manipulated by the operator in reaching the various curved, angular and inaccessible parts of the body of an automotive vehicle.

Another object of the invention is the provision of an improved electric polisher, which is sturdy, compact, light, yet powerful, and which is adapted to be used in polishing the surfaces of automotive vehicle bodies to a high and permanent lustre.

Another object of the invention is the provision of an improved handle arrangement for electric polishers of the class described, by means of which the polisher may be more conveniently manipulated without tiring the wrists of the operator in the polishing of vehicle bodies and other articles.

Another object is the provision of an improved anchoring device for the cable conductors, adapted to be used with electric polishers or drill motors.

Other objects and advantages of the invention will be apparent from the following description and from the accompanying drawings, in which similar characters of reference indicate similar parts throughout the several views.

Referring to the drawings, of which there are four sheets,

Fig. 1 is a side elevational view of an electric polisher with the drive shaft pad and lamb's wool bonnet shown in section along a plane passing through the axis of the shaft.

Fig. 2 is a sectional view taken on the plane of the axis of the motor which is parallel to the pad, showing the rear side of the pad and bonnet in elevation.

Fig. 3 is a transverse sectional view taken through the switch casing.

Fig. 4 is an elevational view of the switch actuating member.

Fig. 5 is a fragmentary sectional view taken on the plane of the line 5—5 of Fig. 1, looking in the direction of the arrows.

Fig. 7 is a transverse sectional view taken on the plane of the line 7—7 of Fig. 1.

Fig. 9 is a longitudinal section taken on line 9—9 of Fig. 1.

Figure 6:
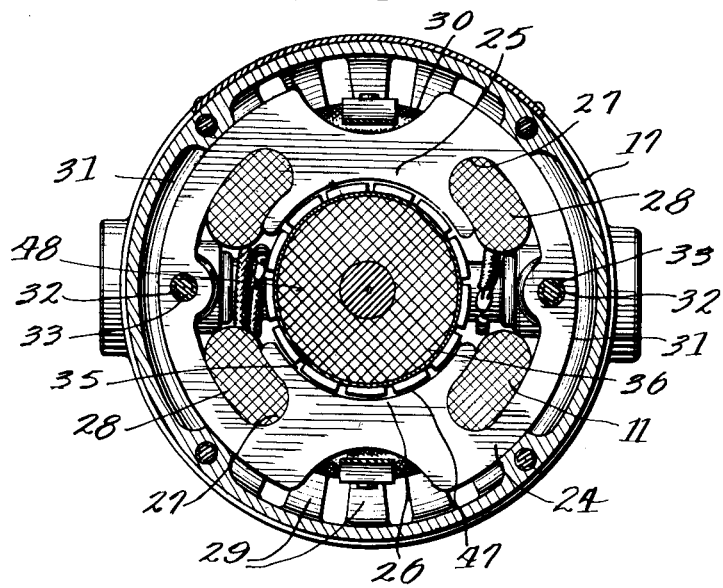
Fig. 6 is a transverse sectional view taken on the plane of the line 6—6 of Fig. 2.
Figure 8:
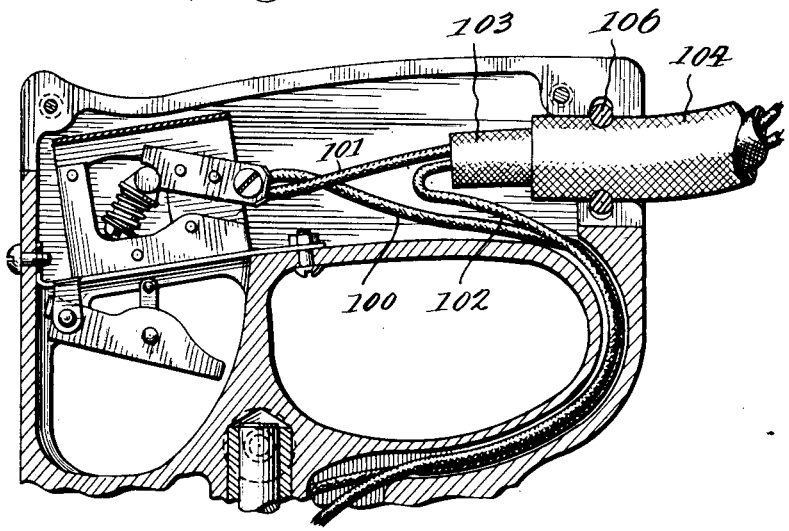
Fig. 8 is a longitudinal sectional view of a modified form of handle for an electric drill, having a similar type of anchor.

Referring to Figs. 1 and 2, the electric polisher constructed according to the present invention is indicated in its entirety by the numeral 10. The polisher 10 preferably consists of an electric motor 11, having a control switch 12, a main handle 13, speed reduction gearing 14, supporting pad 15 and a bonnet or covering 16.

The electric motor 11 is preferably of the series commutator type adapted to be used with alternating or direct current, having a speed of approximately 1500 R. P. M. no load and 1500 R. P. M. under load. It should be understood that the speeds specified are merely exemplary of one of the preferred embodiments of the invention and considerable variance in speed is permissible depending upon the type of work to be done.

Referring to Fig. 1, the motor 11 is preferably provided with a relatively light casing 17, formed of aluminum alloy or other relatively light metal. The casing 17, being substantially cylindrical in shape and having its lower end closed by wall 18, while its upper end 19 is open, being effectively closed by the casing 20 for the speed reduction gearing.

The motor casing 17 forms a substantially cylindrical recess 21, at one end of which there are formed intergral, inwardly projecting lugs 22 having threaded bores 23. The field core 24 of the motor comprises a plurality of laminations of magnetic metal such as soft iron or steel placed together to form a core, the separate laminations being secured by rivets or other convenient fastening means. The laminations are of substantially circular exterior shape as shown in Fig. 6, but are provided with a pair of inwardly projecting pole pieces 25 and 26, each of which is formed with grooves 27 for receiving the field coils 28.

The cylindrical casing 17 is formed with a plurality of longitudinally extending, inwardly projecting ribs 29 for engaging the cylindrical surface of the field core and each rib 29 is, therefore, provided with an inner cylindrical surface 30. The space 31 between the casing 17 and the field core 24 provides a ventilation conduit outside of the core for the passage of cooling air.

The field core 24 is provided with a plurality of axially extending bores 32 for receiving the securing bolts 33 which also preferably secure in place, a shield or baffle for controlling the direction of the air currents.

Baffle 34 comprises an annular sheet steel member having an outer circular outline adapted to fit inside the casing 17 and provided with grooves to receive the ribs 29. The shield 34 has an enlarged circular aperture 35 of sufficient size to pass the armature 36 and forming an intake opening for a centrifugal fan having an impeller 37. The shield 34 is preferably permanently riveted to a pair of spacer ferrules 38, also provided with circurlar bores 32 for receiving the bolts 33 and the shield, ferrules and core 24 may be clamped in the casing 17 against the lugs 22 by the bolts 33.

The closed end 18 of the motor casing is provided with a multiplicity of ventilation openings 39 for the intake of cooling air which passes through the conduits 31 and other spaces surrounding the field and armature when the motor is in operation. The end 18 is also formed with a substantially cylindrical socket 40 axially located with respect to the motor casing 17 and provided with accurately machined lining 41. The lining 41 may be provided with a lug 42 extending through an aperture 43 and the lining 41 is secured in place by riveting over the lug 42.

The screw plug 44 in Fig. 1 closes a threaded lubricant conduit which leads to the interior of the lining 41 and is adapted to be used for forcing solid lubricant into the interior of the lining 41.

The armature 36 comprising a shaft 45 provided with commutator shaft 46, supporting armature laminations 47 and winding 48.

The lower end of the shaft 45 in Fig. 2 fixedly supports an inner race 49, having a groove 50 of circular cross section for receiving the ball bearings 51. The other race 52 has a similar inner groove 53 and the race 52 is mounted in the lining 41, but may be removed with the complete armature assembly. The antifriction bearing 49, 51 and 52 is also preferably provided with an oil seal on the armature side, comprising a sheet metal plate 54 and a steel washer 55 so that the steel lining 41 may be kept full of relatively solid lubricant at all times. At the opposite end of the shaft 45 there is an annular shoulder 56 and a reduced portion 57.

The impeller 37 preferably comprises a cast metal member formed with a hub 58 carrying a circular plate 59. Adjacent its outer edge the plate 59 carries a multiplicity of radially extending flat blades 60 and the blades 60 are adapted to react against the air in their immediate vicinity and impel the air outward by centrifugal action. The aperture 35 in shield 34 forms an inlet for the centrifugal fan and the blades 60 are preferably spaced from the hub 58 leaving an open space 61 at the hub leading from the inlet 35.

The end of the motor casing is closed by the cover plate 62 on the speed reduction gearing casing 20, which is suitably formed to provide a multiplicity of circumferentially extending slots 63 between the cover plate 62 and the end 18 of casing 17. For this purpose the cover plate 62 engages the casing 17 only at the shoulders 64 shown in Fig. 5 and at other points the cover plate is formed with the bevelled surface 66 for directing the outward current of air. Cover plate 62 is secured to casing 17 by a plurality of screw bolts 66 which pass through the cover plate 62 and are threaded into the ribs 29 of casing 17. These bolts also secure the speed reduction gearing casing 20 to the motor since the gearing casing is fastened to cover plate 62.

The motor casing 17 is provided with a pair of transversely extending bores 67, each of which is lined with a tube 68 of insulation, which supports a metal brush tube 69. At its outer end the brush tube 69 is threaded as at 70 to receive an insulating cap 71. At its inner end the brush tube 69 is formed with squared or a non-circular aperture 72 for slidably receiving a carbon brush 73. The brush 73 is formed with an axially extending lug 74, which is engaged by one end of a helical coil spring 75.

A pig tail of flexible copper wire extends from the interior of the carbon block 73 to the metal plate 76. The insulating cap 71 comprises a moulded insulating member which is moulded about a brass cap 77 having threads 78 for engaging the threads 70 and having a circular bore 79 for receiving the plate 76.

The pig tail 80 is moulded in the carbon block 73 at one end and is soldered to the plate 76 at the other end and it will thus be observed that the brush tube 69 is always in direct electrical connection with the brush 73 through a circuit of very low resistance.

The inner end of the brush tube 69 carries annular flange 81 forming connector groove 82 for receiving a coil spring connector 83. Since the armature and field are connected in series in the usual manner of series motors, and the control switch is also in series, the wiring will be evident to one skilled in the art and it is not necessary to show a wiring diagram.

The motor casing 17 preferably supports at its closed end 18 a combined switch casing 84 and handle 85. The motor casing 17 is preferably provided with a downwardly projecting flange 86, which is substantially rectangular in plan and the flange 86 is provided with a reduced portion 87 adapted to fit in a complementary recess formed in the wall of the switch casing 84. The switch casing 84 and handle 85 comprise an integral cast metal member, preferably formed of the same light alloy as the motor casing 17, the switch casing 84 being of substantially box shape and forming a chamber communicating through a tapered or rounded portion 88. The switch casing and handle are secured to the motor casing by a plurality of screw bolts 89, which pass through the switch casing 84 and are threaded into the end 18 of motor casing 17. The switch which is indicated in its entirety by the numeral 90 preferably comprises a snap switch unit, having a moulded insulating casing which is screwed to the switch casing 84 by screw bolts 91 passing through the switch and threaded into lugs 92 carried by the interior of casing 84.

Snap switch 90 is formed with an actuating member 12 which is pivotally mounted in the casing at the point 93 and which is also formed of moulded insulating material. Actuating member 12 is provided with a pair of relatively flat thumb engaging surfaces 94 and 95, which are angularly related to each other by a movement equal to the angular movement of the switch actuating member 12.

Referring to Fig. 3, it will be observed that the left side of the switch member 12 projects above the casing, the flat surface 94 projecting sufficiently to be engaged by the thumb when the flat surface 95 has wholly receded into the switch casing 90.

The movement provided for the switch member 12 is such that when the member 12 is actuated by pushing on the surface 94, it moves until surface 94 is flush with the top of the switch case 90 and surface 95 is brought up into position to be engaged by the thumb of the operator.

The switch actuating member 12 is also formed with relatively flat surfaces 96 and 97 at each end of the thumb surfaces 94 and 95. The surface 96 bears the indicia "On" while the surface 97 bears the indicia "Off".

The inclination of the surfaces 96 and 97 downward with respect to the surfaces 94 and 95 respectively, carries the indicia down below the upper edge of the switch casing 90 whenever the side of the switch member 12 is in its lowest position so that practically only one of the indicia is visible at the same time. That is, when the switch is in the position of Fig. 3, it reads "On" because the "Off" indicia has been substantially withdrawn into the casing 90. Consequently the switch actuating member 12 serves not only to control the switch but to indicate its position very effectively.

The switch actuating member 12 is preferably pivoted on an axis 93, which extends longitudinally of the handle 85, so that when the handle is grasped by the digits of the hand, the thumb may extend longitudinally of the handle into a position above the switch actuating member 12. The operator is thus adapted to hold the handle at all times and have his thumb in position to turn the switch on or off without releasing the handle and without the necessity for using his other hand.

The switch casing 84 is provided with an angular aperture for receiving the insulating casing 95, which has a reduced complementary portion 98 fitting into said aperture. This brings the upper edge of the insulating switch casing 90 flush with the outer surface of the metal casing 84.

One of the most important features of the present invention is the provision of an improved handle 85 peculiarly adapted to permit the more convenient manipulation of the polisher without tiring the wrist of the operator. The tubular handle 85 provides a conduit for three conductors 100, 101, 102, each comprising a flexible wire insulated with the usual rubber and cloth coverings.

The conductor 101 is preferably connected to one of the screw bolts 91, thereby grounding the metallic casings 17, 86 when the other end of this conductor is appropriately connected to ground. The other two conductors lead to an ordinary plug connector for insertion in a wall socket, and all three conductors are preferably covered with a flexible and resilient unitary rubber covering 103 which is adapted to prevent access of water to the conductors and to protect the conductors from wear.

The present polishing devices are naturally subjected to a great deal of movement, and the movement of the polisher subjects the cable 103 to repeated bending at the point of its egress from the tubular handle 85. In order to prevent abrupt bends in the cable at the end of the handle 85, the cable is preferably provided with a tubular rubber hose 104 which covers cable 103 from a point 105 located inside the tubular handle 85, and extends along the cable 103 outside the handle for a sufficient distance to insure the protection of the cable adjacent the handle and form a relatively easy bend in the cable at the end of the handle.

For instance, the hose 104 may be eight inches or a foot in length and the hose is slidably mounted on the cable 103. In order to fixedly secure the hose 104 on the cable and to anchor the cable to the polisher so that no mechanical strain will be placed upon the wires 100—102 and their connectors inside the handle, the cable 103 and hose 104 are clamped by a thick metal wire 106 in the shape of a ring which is forced into clamping engagement with the hose 104 so tightly that it also clamps the rubber covered cable 103. The hose 104 being interposed between metal ring 106 and cable 103, there is practically no possibility of the metal ring 106 injuring the rubber cable 103, but the metal ring 106 provides a means for fixedly anchoring the cable and hose to the handle.

The handle 85 is provided with a bore 107 of sufficient size to receive cable 103 and of sufficient size to receive hose 104. When hose 104 is placed in bore 107, the ring 106 is brought into engagement with the open end of handle 85. Handle 85 is provided with threads 109 along its end and a tubular metal member 110 having complementary threads is adapted to clamp the metal ring 106 against the end of handle 85.

The tubular metal member 110 may be provided with an inwardly extending annular flange engaging outside the metal ring 106 and it is preferably embedded in a ball 111 of molding insulating material such as a phenolic condensation compound. The ball 111 covers the tubular metal member 110 and is provided with a bore 112 for the hose 104. The bore 112 is preferably provided with a bell-shaped curved surface 113 at its outer end for the purpose of further reducing the tendency toward forming sharp bends in the cable and hose at the point of its egress from the handle.

The ball 111 is located to be engaged by the palm of the hand when the thumb of the operator is immediately adjacent the switch and this ball permits the operator to pivot the electric polisher in the hollow of one hand while using the other hand upon a handle 114 carried by the body of the polisher. This greatly reduces the strain on the wrist of the operator since it is unnecessary to bend the wrist of the hand which is holding the ball 111, but the ball is permitted to slide in the hollow of the hand. As it is necessary to apply a considerable amount of force in certain polishing operations, this handle arrangement is very advantageous in reducing the fatigue of the operator and increasing the ease of manipulation of the polisher.

The cover plate 62 for the gear housing 20 is provided with a reduced portion 115 adapted to be received in a complementary flange 116 carried by gear housing 20. The gear housing 20 comprises a cast metal member formed with a circular attaching flange 116 at one end and formed with a circular bore 117 at the other end. The gear housing 20 is provided with a socket 118 in the form of a circular bore which is aligned with the bore 117. The bore 118 provides a socket for an anti-friction bearing comprising an outer race 119, ball bearings 120, and an inner race 121. The inner race 121 is fixedly secured on the reduced end 122 of a shaft 123.

The shaft 123 is preferably formed with an enlarged portion 124 forming an annular shoulder 125 against which is located the inner race 126. The shaft 123 is also provided with a spacer 127 and a pinion 128 for engaging a worm 129. The pinion 128 may be secured on shaft 123 by a threaded member 130 which clamps race 126, spacer 127 and pinion 128 against the annular shoulder 125.

The bore 117 may be provided with a cover plate 131 having an inwardly extending annular flange 132 and the cover plate 131 is formed with an enlarged bore 133. Cover plate 131 may be secured to gear housing 20 by a plurality of screw bolts 134.

The bore 133 of cover plate 131 may be provided with a tubular oil seal housing 135 having a pressed frictional fit in the bore 133 and having an inwardly extending flange 136 at its outer end. The oil seal housing 135 supports the outer race 137 which is provided with a circular groove for receiving the ball bearing 138. The enlarged cylindrical portion 124 of the shaft 123 rotatably engages a leather washer 139 having a tubular flange in engagement with the cylindrical part 124, and a garter spring 140, consisting of an endless helical spring, draws the leather ring 139 into engagement with shaft part 124.

The shaft 123 is also provided with an annular shoulder 141 and the cylindrical portion 142 of the shaft supports a cylindrical metal member 143 which is fixedly secured to the shaft by a transverse pin 144 passing through the member 143 and shaft portion 142.

The cylindrical metal member 143 is preferably provided with a transverse circular bore 145 of sufficient size to receive a rod or pin adapted to be inserted in said bore to hold the shaft still while the hub 146 of the supporting pad 15 is threaded on the reduced threaded end 147 of the shaft. The hub 146 and cylindrical metal member 143 are provided with flat thrust surfaces 148, adapted to engage each other and to cause the pad 15 to rotate with the shaft when the hub is threaded home.

The pad 15 preferably comprises the hub 146, a metal supporting plate 150, and a felt or rubber supporting disc 151. Hub 146 is provided with a radially extending body to which is secured by rivets 152, the supporting plate 150. Supporting plate 150 is provided with a backwardly curved peripheral edge 153 to prevent cutting of the rubber disc 151 when it flexes backward.

The rubber disc 151 comprises a circular resilient, and live rubber member having a multiplicity of small circular discs 154 of canvas and relatively larger discs 155 of canvas molded within the body of the rubber and located close to the face thereof in order to reinforce the rubber. The disc 151 tapers in thickness toward its outer edge and is adapted to flex backward and provide a flexible and resilient support for the bonnet or covering 16. Resilient rubber disc 151 is secured to metal plate 150 by a plurality of rivets 157.

The covering 16 may in appropriate cases consist of a cloth covering with an emery face or sandpaper cemented to its face, or ordinary sanding discs may be secured to the face of the pad 15 by means of a securing member threaded into the threaded bore 156 of hub 146.

It will thus be observed that the present device may also be used for sanding or cleaning operations and various appropriate tools may be secured to the shaft of the polisher to increase its utility. The lambs wool bonnet 16 comprises a circular pelt of native lambs wool, having a hide 158, and the native wool 159 carried thereby located on the outside of the bonnet.

The leather 158 of the pelt is of sufficient size to extend about the edge of the rubber disc 151 and downward on the backside to the point 160 where it is preferably sewed or otherwise secured to a leather or cloth strip 161 by stitching 162. The leather strip 161 is formed with a plurality of cutouts 162 adapted to permit the portions of the leather strip 161 to be drawn closer together, but in the case of a cloth strip, cutouts would be unnecessary.

The leather strip 161 is folded back upon itself and stitched together to form a loop 163 which extends continuously about the edge of the lambskin bonnet and is adapted to receive a draw cord 164. When the lambs wool bonnet 16 is placed on the pad 15 as shown, and the draw string 164 is pulled tight and tied, the lambs wool covering is effectively secured on the pad in such manner that it is adapted to flex with the pad.

Referring to Fig. 2, the supporting plate 62 is provided with a cylindrical aperture 165 adapted to receive a ferrule or lining 166 having a radially and inwardly extending flange 167. The shaft 45 at this end supports a spacer 168 and an inner race 169 having a circular groove for receiving the balls 170 which are also supported by an outer race 171. The outer race fits in the lining 166 and is preferably frictionally secured therein.

On the side of the races 169, 171 toward the motor armature 36, the race 171 is provided with a pair of metal plates 172, 173 adapted to support a packing or washer between them to provide an oil seal. On the opposite side of the ball bearings, the shaft 45 supports a plate 174 which is of sufficient size to cover the open end of the lining 166 and prevent lubricant from flowing out of the gear casing 20.

The shaft 45 also supports the pinion 175 which is adapted to engage a gear 176 carried by shaft 177. Shaft 177 is rotatably mounted in anti-friction bearings 178 and 179 which may be of the same construction as the anti-friction bearings previously described. The anti-friction bearings 178, 179 have their outer races frictionally mounted in their sockets 180, 181 formed in the gear casing 20 and their inner races are preferably fixedly supported upon reduced portions of the shaft 177. An auxiliary bearing for shaft 177 is provided by the socket 182 of plate 62.

The shaft 177 supports the worm 129 which preferably forms an integral part of said shaft, and which engages the worm gear 128. The gear housing 20 is preferably filled with solid lubricant so as to continually maintain the speed reduction gearing in a bath of relatively thick lubricant and effectively lubricate these gears at all times.

The gear housing 20 is preferably provided with two or more bores 183 formed in outwardly extending lugs or bosses 184 for the purpose of supporting handles 114. The bores 183 fixedly support milled cylindrical metal members 185 which may be a drive fit in the bores 183, and which are provided with threaded bores 186. The metal members 185 are preferably located at the opposite sides of the gear housing at the top of the polisher, so as to support the handles 114 in a plane parallel to the face of a disc 15, but if desired, another handle may be provided on the back side of the gear casing 20, parallel to the shaft 123. As a general rule, only two handles will be employed at the same time, and consequently the handles 114 are preferably made detachable so that they may be shifted from side to side to suit the convenience of the operator, and to permit the operator to bring the pad into engagement with parts of a vehicle body without interference with a handle 114 located on the side of the pad that is being used.

The handle 114 preferably comprises a tubular member 187 of fiber or insulating material, such as a phenolic condensation product, provided with end fittings 188 and 189. The end fitting 188 has a reduced cylindrical portion 190 adapted to be received in the tube 187 and an enlarged spherical surface 191 forming a continuation of the outer surface of tube 187, and providing a rounded end for the handle when the parts are assembled as shown in Fig. 2.

Fitting 188 is provided with a bore 192 for receiving a bolt 193 and a counterbore 194 for receiving the head of said bolt, which is preferably rounded off to a spherical surface like the surface 191, and has its outer surface located flush with the surface of the fitting or cap 188.

The fitting 189 likewise has a reduced cylindrical portion 195 adapted to be received in the tube 187 and has an annular radially extending flange 196 for engaging the end of the tube 187. Bolt 193 passes through a bore 197 in the fitting 189 and a nut 198 having a frusto-conical surface 199 engages a complementary frusto-conical socket 200 in an enlarged bore 201. The enlarged bore 201 is of sufficient size to fit on the cylindrical lug 184 and the threaded end 202 of bolt 193 projects beyond the nut 198 a sufficient distance to be received in the threaded bore 186.

When the handle 114 has its bolt 193 threaded into the bore 186 as shown, the flat surface 203 on radial flange 196 engages a complementary flat annular surface 204 on the body of the gear casing 20. The handle 114 is thus supported from its middle by the bolt 193, but is reinforced by the engagement between the lug 184 and bore 201, and by the flat surfaces 203 and 204.

The nut 198 is threaded home to clamp the fittings 188 and 189 together on the tube 187 to make the handle a unit which can be very conveniently removed and placed on either side of the polisher.

The operation of the present polisher is as follows:

When the switch actuating member is pressed to the "On" position, the motor is energized and armature 36 drives the armature shaft 45 at a speed which is sufficient for motor operation, but which is too fast for polishing operations. The drive shaft 123 is driven by the motor shaft 45 through the gears 175, 176, 129, 128 at a reduced speed which is appropriate for polishing operations, at which the body finish will not be burned, and which has been found to be the most efficient and desirable speed for such polishing operations. The regulation of the motor is also better at these speeds because the peripheral force at the polishing pad is greater by reason of the reduction in speed.

The operator may then grasp a handle 114 in one hand and the ball 111 in the other and manipulate the polishing pad 16 against the body in such manner that various cleaning and polishing operations may be performed very expeditiously and efficiently.

The lamb's wool coverings are preferably kept clean and should be dry cleaned from time to time, and only used upon surfaces which have been subjected to a preliminary cleaning. The preferred method of effecting a mechanical polishing and finish of an automotive vehicle with the electric polisher, is described in brief, as follows:

The car should be washed or the surface dusted off and all mud or dirt should be washed off with cold water. Tar and grease should be removed with a solvent adapted to dissolve the tar or grease without affecting the paint. One of the most commonly used automotive body paints is dissolved only by alcohol, and consequently any ordinary solvent for tar or grease except alcohol may be used.

A lacquer polish which is provided for use with the electric polisher, should be applied by using a rubber sponge which has been dampened with water and squeezed out as dry as possible. The polish should be applied only to a small panel, such as about two square feet at one time, a thin coat being spread over the surface, and the polish is worked while wet, with the lambs wool bonnet of the electric polisher. The machine should be kept moving as the lambs wool bonnet rotates, and the polishing continued until a dry, lustrous finish is obtained. In extreme cases a second application of the lacquer polish is desirable.

The next step is the application of a polishing wax to provide a permanent finish and protective covering for the body. A cheese cloth pad dampened with water is preferably used for applying the polishing wax which is supplied with the polisher, very sparingly, covering the entire surface, but waxing only a small portion at a time. The cloths and sponges used should always be rinsed frequently and kept clean. The lambs wool bonnet is applied to the wax and the waxed surface is polished while still damp, the machine being moved from place to place as the pad rotates, and the polishing continued until a lustrous and permanent finish is produced. The wax clouds or lint may be removed from the polishing surface by hand, using a clean piece of cheese cloth.

It will thus be observed that I have invented a new electric polisher which is peculiarly adapted to effect the cleaning and wax polishing of automotive vehicle bodies in a very efficient and effective manner, producing a finish which cannot be secured by hand operations. The present polisher is also provided with improved features, such as the switch arrangement which permits its control without moving the hands, and the handles are so formed and located that they permit the manipulation of the polisher without tiring the wrists of the operator.

The present polisher is sturdy, efficient and capable of hard service without overheating, and the effective ventilation and lubrication of the polisher are also important features.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a handle and cable housing for electric motor driven tools, the combination of, an electrical supply cable for connecting said motor to a source of supply, said cable extending into said handle, an auxiliary flexible tubular member covering said cable and adapted to prevent a sharp bend in said cable at the point of its egress from said handle, a metal clamping ring clamping said tubular member into engagement with said cable, said metal clamping member being secured in said handle to anchor said cable, said handle being tubular in form, and a substantially spherical member carried by the end of said handle and having a threaded engagement with said handle for clamping said metal ring against the end of said handle.

2. In a handle and cable housing for electric motor driven tools, the combination of an electrical supply cable for connecting said motor to a source of supply, said cable extending into said handle, an auxiliary flexible tubular member covering said cable and adapted to prevent a sharp bend in said cable at the point of its egress from said handle, a metal clamping ring clamping said tubular member into engagement with said cable, said metal clamping member being secured in said handle to anchor said cable, said handle being tubular in form, and a substantially spherical member carried by the end of said handle and having a threaded engagement with said handle for clamping said metal ring against the end of said handle, said spherical member being provided with a bell shaped opening adjacent said flexible tubular member to prevent a sharp bend in said flexible tubular member.

FRANS O. ALBERTSON.